(12) United States Patent
Cahill

(10) Patent No.: US 6,517,043 B1
(45) Date of Patent: Feb. 11, 2003

(54) SEGMENTED FAN BASE

(75) Inventor: Frank E. Cahill, Lenexa, KS (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/682,784

(22) Filed: Oct. 18, 2001

(51) Int. Cl.[7] ............................................. F16M 11/22
(52) U.S. Cl. ................................... 248/529; 248/188.7
(58) Field of Search ................................ 248/150, 159, 248/346.3, 529, 676, 188.7, 528, 151, 678, 188.6, 523, 525, 527; 416/244 R, 246; 403/294; D11/130.1, 182

(56) References Cited

U.S. PATENT DOCUMENTS

| | | | | | |
|---|---|---|---|---|---|
| 1,574,963 A | * | 3/1926 | Foote | ..................... | 248/188.7 |
| 1,895,717 A | * | 1/1933 | Kelley | ..................... | 248/529 |
| 2,615,620 A | * | 10/1952 | Geottl | ..................... | 416/244 R |
| 2,616,650 A | * | 11/1952 | Thompson | ............... | 248/346.3 |
| D171,558 S | * | 2/1954 | Rice | ............................ | 248/529 |
| 2,730,321 A | * | 1/1956 | Dutton | ........................ | 248/523 |
| 3,637,179 A | * | 1/1972 | Marschak | .................... | 211/205 |
| 3,655,156 A | * | 4/1972 | Petrie | ....................... | 248/188.7 |
| 4,406,437 A | * | 9/1983 | Wright | .................... | 248/188.7 |
| 4,763,866 A | * | 8/1988 | Sinchok | ................... | 248/188.7 |
| 4,821,986 A | * | 4/1989 | White | ..................... | 248/188.7 |
| 4,911,391 A | * | 3/1990 | Ellis | ........................... | 248/165 |
| 5,236,167 A | * | 8/1993 | Tai et al. | .................... | 206/423 |
| 5,368,445 A | * | 11/1994 | Litvin et al. | ................ | 248/159 |
| 5,370,500 A | * | 12/1994 | Thompson | ............... | 248/125.3 |

FOREIGN PATENT DOCUMENTS

| | | | | |
|---|---|---|---|---|
| CA | 943938 | * | 3/1974 | .............. 248/188.7 |
| CA | 959035 | * | 12/1974 | .............. 248/188.7 |
| CH | 430098 | * | 8/1967 | .............. 248/188.7 |
| GB | 811187 | * | 4/1959 | .............. 248/188.7 |

* cited by examiner

Primary Examiner—Ramon O. Ramirez
Assistant Examiner—Jon Szumny
(74) Attorney, Agent, or Firm—Hovey Williams LLP (57) ABSTRACT

A segmented base for supporting a column in a generally upright position. The base includes a plurality of individual base members couplable to one another by positioning base members adjacent one another and shifting base members relative to one another. When coupled to one another, the base members cooperatively defining a base channel for receiving the column.

24 Claims, 4 Drawing Sheets

SEGMENTED FAN BASE

BACKGROUND OF INVENTION

1. Field of the Invention

The present invention relates generally to bases for supporting objects in a generally upright position. In another aspect, the present invention concerns a segmented base for supporting a pedestal fan, wherein the segmented base can be readily assembled and disassembled.

2. Discussion of Prior Art

It is common for pedestal-type fans to be shipped in a disassembled configuration wherein the fan is decoupled from the support column and the support column is decoupled from the base. When shipping an item such as a pedestal-type fan, it is desirable to ship such an item in the smallest container possible in order to minimize packing material and shipping expense. Pedestal fans, especially pedestal fans used for commercial and industrial purposes, require a broad base in order to support the column and fan in a stable, upright position. Such a broad base can dramatically increase the size of the package required to ship the pedestal fan.

In the past there have been attempts to utilize segmented fan bases to reduce the size of the package necessary to ship pedestal fans. These segmented fan bases typically included a plurality of legs which were independently attachable to a common hub within which the support column was received. Prior art segmented fan bases of this type were typically difficult to assemble and unstable.

SUMMARY OF INVENTION

Responsive to these and other problems, an important object of the present invention is to provide an improved segmented fan base that overcomes the problems associated with the prior art. Another object of the present invention is to provide a segmented fan base wherein the individual segments are directly couplable to one another to thereby increase the stability of the overall base. A further object of the present invention is to provide a segmented fan base which can be quickly assembled without the use of a variety of tools.

In accordance with one embodiment of the present invention, a base for supporting a column in a generally upright position is provided. The base comprises a first member and a second member. The first member presents an inner surface and a hook projecting laterally from the inner surface. The hook presents an engagement surface laterally spaced from the first inner surface. The second member presents a second inner surface and a second outer surface. The first and second members are readily shiftable between a disassembled configuration wherein the members are decoupled from one another and an assembled configuration wherein the first inner surface engages the second inner surface and the engagement surface engages the second outer surface. The hook is operable to restrict lateral movement of the members when the members are in the assembled configuration.

In accordance with another embodiment of the present invention, a pedestal apparatus for supporting and elevating a supported member relative to a supporting surface is provided. The pedestal apparatus comprises a base and a support column. The base comprises a plurality of base members. The base is readily shiftable between a disassembled configuration wherein the individual base members are decoupled from one another and an assembled configuration wherein the individual base members are coupled to one another. The individual base members cooperatively define a base channel when the base is in the assembled configuration. The support column is removably received in the base channel and releasably coupled to the base when the base is in the assembled configuration.

In accordance with a further embodiment of the present invention, a pedestal apparatus for supporting and elevating an element relative to a supporting surface is provided. The pedestal apparatus comprises a column and a base. The column is adapted to be coupled to the element. The base is configured to support the column in an upright orientation relative to the supporting surface. The base includes a plurality of interconnectable base members. The base members are configured so that relative shifting of adjacent ones of the base members in a first direction causes interconnecting of the adjacent base members and relative shifting of the adjacent base members in a generally opposite second direction causes decoupling of the adjacent base members. The column and base are configured to cooperatively prevent interconnected, adjacent base members from relative shifting in the second direction when the column and base are coupled to one another.

In accordance with a still further embodiment of the present invention, a pedestal fan assembly is provided. The pedestal fan assembly comprises a base, an elongated support column, and a fan. The base comprises a plurality of base members. The base is readily shiftable between a disassembled configuration wherein the base members are decoupled from one another and an assembled configuration wherein the base members are coupled to one another. At least one of the base members presents a laterally extending hook. At least another of the base members defines an opening. The hook extends through the opening and is operable to restrict relative lateral shifting of the base members when the base is in the assembled configuration. The hook is removed from the opening when the base is in the disassembled configuration. The base members cooperate to define a generally centrally positioned base channel when the base is in the assembled configuration. The support column is releasably coupled to the base when the base is in the assembled configuration. The support column presents a first end which is received in the base channel when the base is coupled to the column. The support column presents a second end to which the fan is coupled.

In accordance with an even further embodiment of the present invention, a method of assembling a pedestal apparatus is provided. The method comprises the steps of: (a) positioning a first wall of a first base member adjacent a first wall of a second base member; (b) shifting the first and second base members relative to one another to thereby couple the first and second base members to one another; and (c) coupling a support column to the first and second base members.

Other aspects and advantages of the present invention will be apparent from the following detailed description of the preferred embodiment and the accompanying drawing figures.

BRIEF DESCRIPTION OF DRAWINGS

A preferred embodiment of the present invention is described in detail below with reference to the attached drawing, figures, wherein.

DETAILED DESCRIPTION

Figure 1:
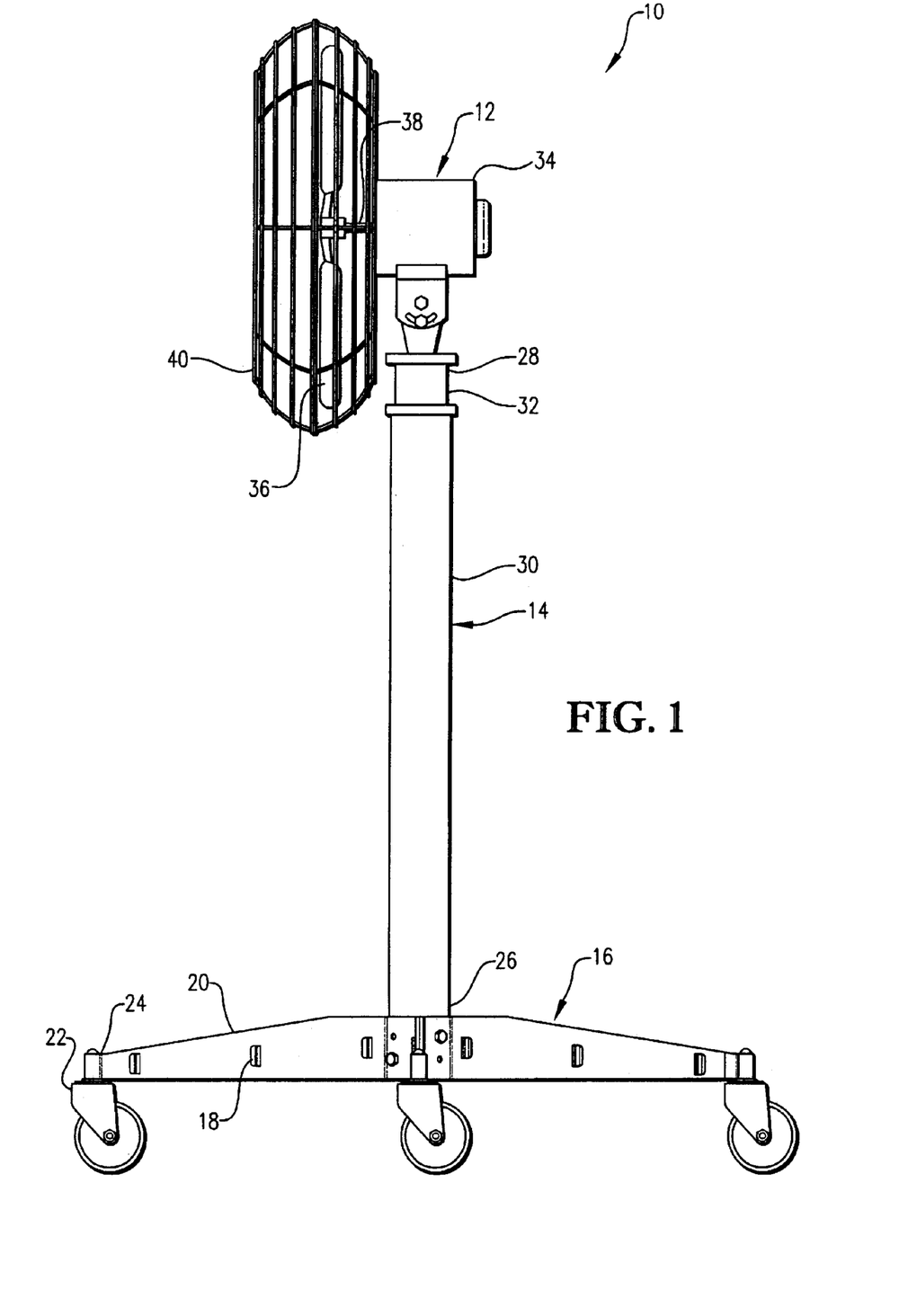
FIG. 1 is a side elevation view of a pedestal fan assembly constructed in accordance with the principles of the present invention.

Referring initially to FIG. 1, a pedestal fan apparatus 10 is illustrated as generally including a fan 12, a support column 14, and a segmented base 16. Base 16 includes a plurality of individual base members coupled together by a plurality of locking mechanisms 18. The assembled individual base members cooperate to form a plurality of outwardly extending legs 20. A wheel assembly 22 can be coupled to a distal end 24 of each leg 20 to thereby allow base 16 to be movably supported on a generally horizontal supporting surface.

Column 14 presents a first end 26 which is releasably coupled to base 16 and a second end 28 which is coupled to fan 12. Column 14 is supported in a generally upright position by base 16. Column 14 includes at least one tubular member 30 coupled to base 16 and extending upwardly therefrom. A second tubular member 32 can be coupled to fan 12 and telescopically received in tubular member 30 so that the vertical position of fan 12 relative to base 16 can be readily adjusted.

Fan 12 can be any fan unit known in the art that is suitable for use as a component of a pedestal-type fan. Preferably, fan 12 is an electrical fan comprising an electrical motor 34, fan blades 36 coupled to a rotating drive shaft 38 of motor 34, and a protective cage 40 surrounding fan blades 36 and coupled to motor 34.

Figures 2, 3, 4:
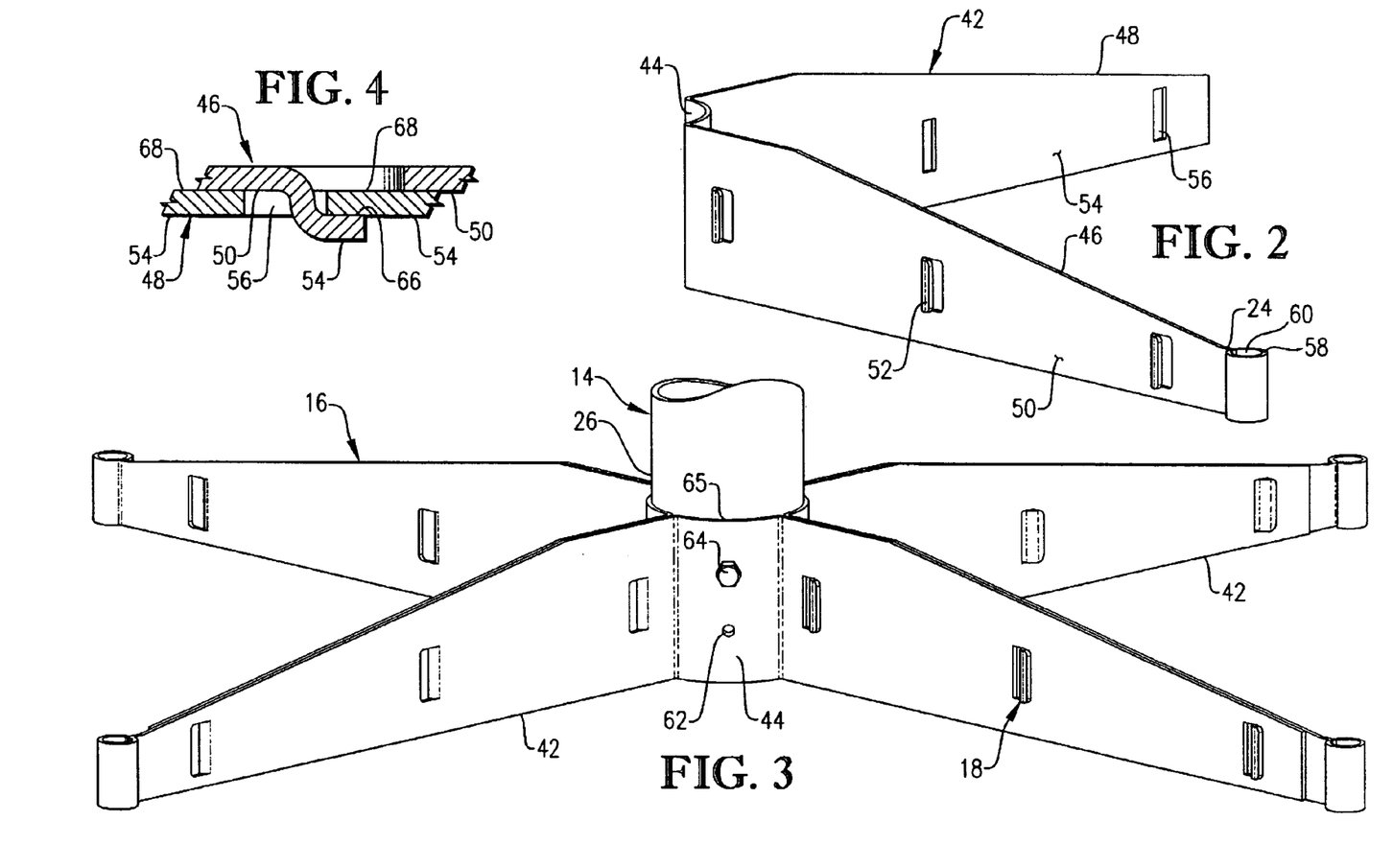
FIG. 2 is an isometric view of one base member of the segmented fan base.
FIG. 3 is an isometric view of the segmented base in an assembled configuration with a support column being coupled to the base.
FIG. 4 is a partial sectional view of the locking mechanism which couples the individual base members to one another when the base is in the assembled configuration.

Referring to FIG. 2, an individual base member 42 of base 16 is illustrated as being formed as a unitary member including a center portion 44, a first wall 46 extending outwardly from center portion 44, and a second wall 48 extending outwardly from center portion 44. First and second walls 46, 48 extend outwardly from center portion 44 generally perpendicular to one another. First wall 46 presents a first inner surface 50 and includes a plurality of generally L-shaped hooks 52 protruding laterally from first inner surface 50. Second wall 48 presents a second outer surface 54 and defines a plurality of generally rectangular openings 56 extending through second wall 48. A wheel support 58 can be formed at distal end 24 of first wall 46 by bending distal end 24 of first wall 46 into a generally cylindrical configuration to form a channel 60.

Referring to FIG. 3, base 16 is illustrated in an assembled configuration wherein individual base members 42 are coupled to one another by locking mechanisms 18. Center portion 44 of individual base member 42 defines a member hole 62 which, when base 16 is in the assembled configuration, is aligned with a column hole (not shown). A fastener 64 can be extended through member hole 62 and the column holes to thereby couple individual base member 42 to first end 26 of column 14. Center portions 44 of individual base members 44 cooperate to define a base channel 65 within which first end 26 of column 14 is received.

Referring to FIG. 4, locking mechanism 18 is operable to releasably couple a first wall 46 of one individual base member with a second wall 48 of another individual base member. First wall 46 presents first inner surface 50 and hook 52 protrudes laterally from first inner surface 50. Hook 52 presents an engagement surface 66 which is laterally spaced from first inner surface 50. Second wall 48 presents a second inner surface 68 and second outer surface 54. Second inner surface 68 and second outer surface 54 are positioned on generally opposite sides of second wall 48. Second wall 48 defines opening 56. Opening 56 extends through second wall 48 between second inner surface 68 and second outer surface 54.

To couple first wall 46 and second wall 48 to one another, hook 52 is extended through opening 56 so that first inner surface 50 and second inner surface 68 engage one another. First wall 46 and second wall 48 are then shifted relative to one another in a first direction so that first inner surface 50 and second inner surface 68 remain in contact with one another and engagement surface 66 of hook 52 engages second outer surface 54 of second wall 48. Thus, because the thickness of second wall 48 (i.e., the lateral distance between second inner surface 68 and second outer surface 54) proximal opening 56 is substantially the same as the lateral distance between first inner surface 50 and at least a portion of engagement surface 66, when first wall 46 and second wall 48 are in the assembled configuration (with first inner surface 50 engaging second inner surface 68 and engagement surface 66 engaging second outer surface 54) relative lateral shifting of first wall 46 and second wall 48 is restrained. By shifting first and second walls 46, 48 relative to one another in a second direction generally opposite the first direction, engagement surface 66 is disengaged from second outer surface 54, thereby allowing first and second walls 46, 48 to be decoupled by laterally shifting hook 52 out of opening 56. As can be seen in FIG. 3, when column 14 is coupled to base members 42, relative shifting of first and second walls 46, 48 of adjacent base members 42 in the first and second directions is restrained. Thus, the configuration of column 14 and base 16 prevents decoupling of individual base members 42 when column 14 is coupled to base 16.

Figure 5:
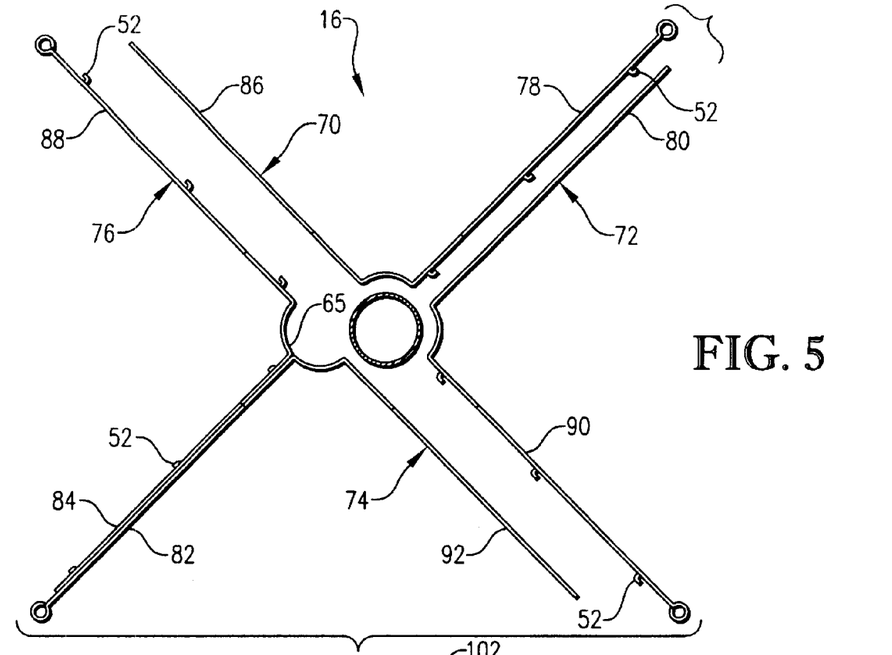
FIG. 5 is a top assembly view of the segmented base showing the manner in which the individual base members are coupled to one another via the locking mechanisms.

Referring to FIG. 5, the manner in which a first base member 70, a second base member 72, a third base member 74, and a fourth base member 76 of base 16 are shifted between a disassembled configuration and an assembled configuration is illustrated. To assemble base 16, first base member 70 and second base member 72 can be coupled to one another by positioning a first wall 78 of first base member 70 adjacent a first wall 80 of second base member 72 so that hooks 52 of first wall 78 extend through openings (not shown) and first wall 80. First base member 70 and second base member 72 can then be shifted relative to one another so that hook 52 couples first walls 78 and 80 to one another in the manner described above with reference to FIG. 4. Once first and second base members 70 and 72 are coupled to one another, third and fourth base members 74, 76 can be coupled to one another by positioning a first wall 82 of third base member 74 adjacent a first wall 84 of fourth base member 76 so that hooks 52 of third base member 74 extend through openings (not shown) in fourth base member 76. Third and fourth base members 74 and 76 can then be shifted relative to one another so that hooks 52 couples third and fourth base members 74, 76 to one another in the manner described above with reference to FIG. 4. Once first and second base members 70, 72 are coupled to one another and third and fourth base members 74, 76 are coupled to one another, coupled first and second base members 70, 72 can be coupled to coupled third and fourth base members 74, 76 by positioning a second wall 86 of first base member 70 adjacent a second wall 88 of fourth base member 76 and a second wall 90 of second base member 72 adjacent a second wall 92 of third base member 74 so that hooks 52 of second wall 88 and second wall 90 are received in openings (not shown) of second wall 86 and second wall 92. Coupled first and second base members 70, 72 and coupled third and fourth base members 74, 76 are then shifted relative to one another so that hooks 52 couple coupled first and second base members 70, 72 and coupled third and fourth base members 74, 76 to one another in the manner described above with reference to FIG. 4. Thus, first, second, third and fourth base members 70, 72, 74, 76 can be coupled to one another by simply placing the individual base members adjacent one another and shifting the individual base members relative to one another in the proper sequence.

When first, second, third, and fourth base members 70, 72, 74, 76 are in the assembled configuration, column 14 can be positioned in base channel 65 and coupled to base 16 in the manner described above with reference to FIG. 3. The coupling of first, second, third, and fourth base members 70, 72, 74, 76 to column 14, further restrains relative shifting of the base members.

Figure 6:
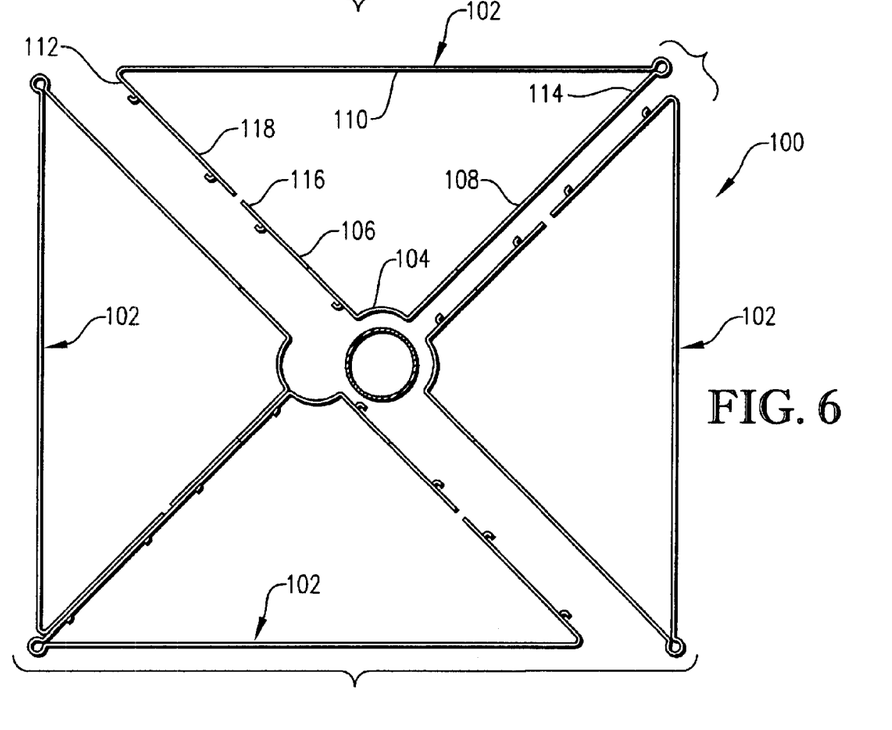
FIG. 6 is a top assembly view of a segmented fan base constructed in accordance with an alternative embodiment of the present invention showing the manner in which the base is assembled.

Referring to FIG. 6, a base 100 according to an alternative embodiment of the present invention is illustrated as comprising four individual base members 102. As with the embodiment described above with reference to FIGS. 1–5, each individual base member 102 includes a center portion 104, a first-wall 106 extending outwardly from center portion 104, and a second wall 108 extending outwardly from center portion 104. However, individual base member 102 further includes a third wall 110 extending between distal ends 112, 114 of first and second walls 106, 108. Further, second wall 108 includes an inner portion 116 and an outer portion 118 which are not directly coupled to one another. However, inner and outer portions 116, 118 can be indirectly coupled to one another by an adjacent individual base member 102 when base 100 is in the assembled configuration. Individual base member 102 is preferably formed of a unitary piece of material which can be bent into the desired shape. The configuration of individual base members 102 does not require inner portion 116 and outer portion 118 to be welded to one another. Individual base member 102 can be assembled in substantially the same manner described above with reference to FIG. 5.

Figure 7:
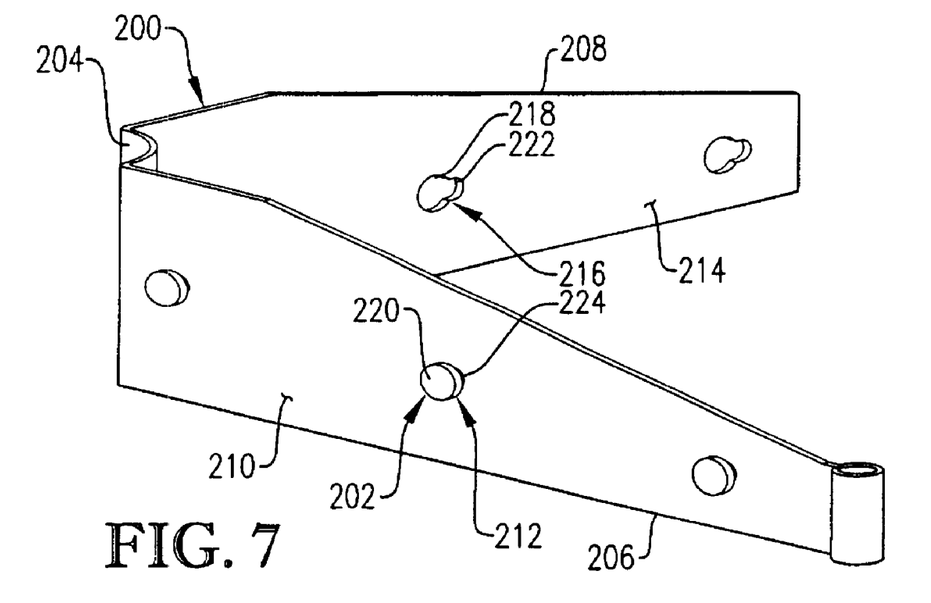
FIG. 7 is an isometric view of an individual base member constructed in accordance with an alternative embodiment of the present invention.

Referring to FIG. 7, an individual base member 200 employing an alternative locking mechanism 202 is shown as generally including a center portion 204, a first wall 206 extending outwardly from center portion 204, and a second wall 208 extending outwardly from center portion 204. First wall 206 presents a first inner surface 210 and includes a plurality of hooks 212 projecting laterally from first inner surface 210. Second wall 208 presents a second outer surface 214 and defines a plurality of openings 216 extending through second wall 208. Openings 216 generally include a wide portion 218 sized to receive a generally circular head 220 of hook 212 and a narrow portion 222 sized to receive a generally cylindrical stem portion 224 of hook 212.

Figure 8:
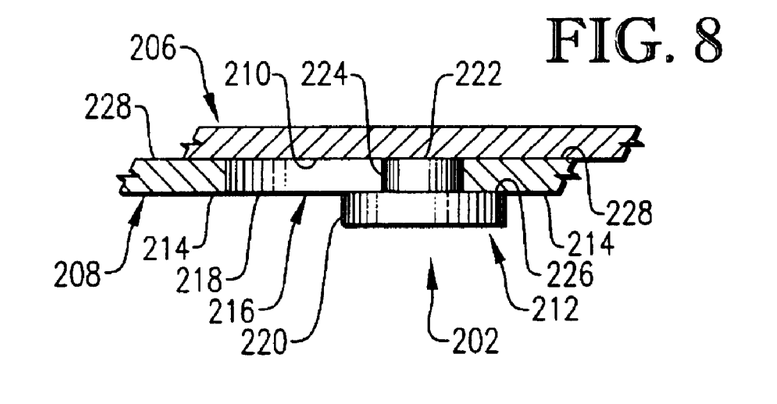
FIG. 8 is a partial sectional view showing the locking mechanism employed to assemble individual base members such as the one illustrated in FIG. 7.

Referring to FIG. 8., first wall 206 of individual base member 200 and second wall 208 of a separate individual base member 200 can be coupled to one another by locking mechanism 202. Hook 212 projects laterally from inner surface 210 of first wall 206. Head 220 of hook 212 presents an engagement surface 226 which is spaced laterally from inner surface 210. To couple first wall 206 and second wall 208 to one another, first inner surface 210 of first wall 206 is placed adjacent a second inner surface 228 of second wall 208 with hook 212 extending through wide portion 218 of opening 216. First wall 206 and second wall 208 can then be shifted relative to one another so that first inner surface 210 and second inner surface 228 remain in contact with one another to thereby shift hook 212 into narrow portion 222 of opening 216. Such relative shifting of first and second walls 206, 208 couples first and second walls 206, 208 to one another and inhibits lateral movement of first and second walls 206, 208 to one another because first inner surface 210 and second inner surface 228 engage one another and second outer surface 214 and at least a portion of engagement surface 226 engage one another. Thus, when individual base member 200 is in the assembled configuration, stem portion 224 of hook 212 is received in narrow portion 222 of opening 216 and relative lateral shifting of first wall 206 and second wall 208 is at least substantially restrained by hook 212.

The individual base members of the segmented base of the present invention can be formed of any material having suitable strength and rigidity to support a pedestal fan used for commercial or industrial purposes. Preferably, each base member is formed by bending a unitary piece of metal into the desired shape, without requiring welding or bolting of different components to form the individual base member.

The preferred forms of the invention described above are to be used as illustration only, and should not be utilized in a limiting sense in interpreting the scope of the present invention. Obvious modifications to the exemplary embodiments, as herein above set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A base for supporting a column in a generally upright position, said base comprising:

a first member presenting a first inner surface and an engagement element, said engagement element presenting an engagement surface laterally spaced from the first inner surface; and a second member presenting a second inner surface and a second outer surface, said members readily shiftable between a disassembled configuration wherein the members are decoupled from one another and an assembled configuration wherein the first inner surface engages the second inner surface and the engagement surface engages the second outer surface, said engagement element operable to restrict relative lateral movement of the members when the members are in the assembled configuration, said second member defining an opening extending through the second member between the second inner surface and the second outer surface, said engagement element extending through the opening when the members are in the assembled configuration.

2. The base according to claim 1, said members cooperating to at least partially define a base channel when the members are in the assembled configuration, said base channel adapted to receive the column.

3. The base according to claim 2, said first member including a first center portion and a first wall portion extending from the first center portion, said second member including a second center portion and a second wall portion extending from the second center portion, said center portions cooperating to at least partly define the base channel.

4. The base according to claim 3, said first and second wall portions extending from the base channel in generally opposite directions.

5. The base according to claim 1, said first member including a first center portion and a pair of first walls extending from the first center portion, one of said first walls defining the first inner surface.

6. The base according to claim 5, said second member including a second center portion and a pair of second walls extending from the second center portion, one of said second walls defining the second inner surface, the second outer surface, and the opening.

7. The base according to claim 6, said center portions cooperating to at least partially define a base channel when the members are in the assembled configuration, said base channel adapted to receive the column.

8. The base according to claim 7, said pair of first walls extending from the first center portion in generally perpendicular directions, said pair of second walls extending from the second center portion in generally perpendicular directions.

9. The base according to claim 8, said one of said first walls and said one of said second walls positioned adjacent one another when the members are in the assembled configuration.

10. The base according to claim 7, each of said center portions defining a hole adapted to couple the center portion to the column.

11. A pedestal apparatus for supporting and elevating a supported element relative to a supporting surface, said pedestal apparatus comprising:

a base comprising a plurality of base members, said base readily shiftable between a disassembled configuration wherein the base members are decoupled from one another and an assembled configuration wherein the base members are coupled to one another, said base members cooperatively defining a base channel when the base is in the assembled configuration; and a support column removably received in the base channel and releasably coupled to the base when the base is in the assembled configuration, one of said base members including a laterally projecting hook, another of said base members defining an opening, said hook extending through the opening when the base is in the assembled configuration to thereby inhibit relative lateral shifting of said one of said base members and said another of said base members, each of said base members including a center portion and a first wall extending from the center portion, said center portions cooperating to at least partially define the base channel, said first wall of said one of said base members presenting the hook, said first wall of said another of said base members defining the hole, said first wall of said one of said base members and said first wall of said another of said base members positioned adjacent one another when the base is in the assembled configuration, said first wall of said one of said base members and said first wall of said another of said base members extending outwardly from the base channel at least substantially parallel to one another, each of said base members including a second wall, said second wall extending from the center portion in a direction which is substantially perpendicular to the direction in which the first wall extends from the center portion, said first wall of said one of said base members presenting a first inner surface, said hook extending laterally from said first inner surface, said hook presenting an engagement surface laterally spaced from the first inner surface, said first wall of said another of said base members presenting a second inner surface and a second outer surface, said first and second inner surfaces engaging one another when the base is in the assembled configuration, said engagement surface and said second outer surface engaging one another when the base is in the assembled configuration.

12. A pedestal apparatus for supporting and elevating an element relative to a supporting surface, said pedestal apparatus comprising:

a column adapted to be coupled to the element; and a base configured to support the column in an upright orientation relative to the supporting surface, said base including a plurality of interconnectable base members, said base members configured so that relative shifting of adjacent ones of the base members in a first direction causes interconnecting of the adjacent base members and relative shifting of the adjacent base members in a generally opposite second direction causes decoupling of the adjacent base members, said column and base configured to cooperatively prevent interconnected, adjacent base members from relative shifting in the second direction when the column and base are coupled to one another.

13. The pedestal apparatus according to claim 12, one of said adjacent base members including a laterally projecting hook, another of said base members defining an opening, said hook extending through the opening and restraining relative lateral shifting of the adjacent base members when the adjacent base members are intercoupled.

14. A method of assembling a pedestal apparatus, said method comprising the steps of:
(a) positioning a first wall of a first base member adjacent a first wall of a second base member;
(b) shifting the first and second base members relative to one another to thereby couple the first and second base members to one another;
(c) coupling a support column to the first and second base members,
step (a) including extending a first hook projecting from one of the first walls of the first and second base members into a first opening defined by the other of the first walls of the first and second base members;
(d) positioning a first wall of a third base member adjacent a first wall of a fourth base member;
(e) shifting the third and fourth base members relative to one another to thereby couple the third and fourth base members to one another,
step (d) including extending a second hook projecting from one of the first walls of the third and fourth base members into a second opening defined by the other of the first walls of the third and fourth base members;
(f) positioning second walls of the coupled first and second base members adjacent second walls of the coupled third and fourth base members;
(g) shifting the coupled first and second base members relative to the coupled third and fourth base members to thereby couple the coupled first and second base members to the coupled third and fourth base members,
step (f) including extending a third hook projecting from one of the second walls of the coupled first and second members and the coupled third and fourth members into a third opening defined by the other of the second walls of the coupled first and second members and the coupled third and fourth members; and
(h) inserting the column in a base channel cooperatively defined by the first, second, third, and fourth base members,
step (c) including extending a fastener through aligned holes in one of the base members and the column.

15. A pedestal apparatus for supporting and elevating a supported element relative to a supporting surface, said pedestal apparatus comprising:
a base comprising a plurality of base members, said base readily shiftable between a disassembled configuration wherein the base members are decoupled from one another and an assembled configuration wherein the base members are coupled to one another, said base members cooperatively defining a base channel when the base is in the assembled configuration; and
a support column removably received in the base channel and releasably coupled to the base when the base is in the assembled configuration,
one of said base members including a laterally projecting hook,
another of said base members defining an opening,
said hook extending through the opening when the base is in the assembled configuration to thereby inhibit relative lateral shifting of said one of said base members and said another of said base members,
each of said base members including a center portion and a first wall extending from the center portion,
said center portions cooperating to at least partially define the base channel,
each of said center portions defining a member hole,
said column defining a plurality of column holes,
said member holes and said column holes aligned with one another when the column is received in the base channel.

16. The pedestal apparatus according to claim 15; and
a plurality of fasteners each extending through respective member and column holes to thereby couple the column to the base.

17. The pedestal apparatus according to claim 15,
said first wall of said one of said base members presenting the hook,
said first wall of said another of said base members defining the hole,
said first wall of said one of said base members and said first wall of said another of said base members positioned adjacent one another when the base is in the assembled configuration.

18. The pedestal apparatus according to claim 17,
said first wall of said one of said base members and said first wall of said another of said base members extending outwardly from the base channel at least substantially parallel to one another.

19. The pedestal apparatus according to claim 18,
each of said base members including a second wall,
said second wall extending from the center portion in a direction which is substantially perpendicular to the direction in which the first wall extends from the center portion.

20. A pedestal fan assembly comprising:
a base comprising a plurality of base members, said base readily shiftable between a disassembled configuration wherein the base members are decoupled from one another and an assembled configuration wherein the base members are coupled to one another, at least one of said base members presenting a laterally extending hook, at least another of said base members defining an opening extending through said at least another of said base members, said hook extending through the opening and operable to restrict relative lateral shifting of said at least one of said base members and said at least another of said base members when the base is in the assembled configuration, said hook removed from the opening when the base is in the disassembled configuration, said base members cooperating to define a generally centrally positioned base channel when the base is in the assembled configuration;
an elongated support column which is releasably couplable to the base when the base is in the assembled configuration, said column presenting a first end and a second end, said first end received in the base channel when the column is coupled to the base; and
a fan coupled to the second end of the support column.

21. The pedestal fan assembly according to claim 20,
each of said base members including a center portion and a wall extending from the center portion, said center portions cooperatively defining the base channel when the base is in the assembled configuration, each of said center portions defining a member hole, said column defining a plurality of column holes, said member holes and said column holes aligned with one another when the column is coupled to the base.

22. The pedestal fan assembly according to claim 21; and a plurality of fasteners each extending through respective member and column holes to thereby couple the column to the base.

23. The pedestal fan assembly according to claim 20, each of said base members including a pair of walls which extend generally perpendicular to one another.

24. The pedestal fan assembly according to claim 23, at least one of the walls of one of the base members being positioned adjacent at least one of the walls of another of the base members when the base is in the assembled configuration.

\* \* \* \* \*